(12) United States Patent
Nemeth et al.

(10) Patent No.: US 12,139,209 B2
(45) Date of Patent: Nov. 12, 2024

(54) STEERING TRANSMISSION FOR ELECTROMECHANICAL STEERING SYSTEM FOR A VEHICLE AND ELECTROMECHANICAL STEERING SYSTEM FOR A VEHICLE

(71) Applicant: KNORR-BREMSE Systeme fuer Nutzfahrzeuge GmbH, Munich (DE)

(72) Inventors: Huba Nemeth, Budapest (HU); Bernd-Robert Hoehn, Munich (DE); Franz-Thomas Mitterer, Osterhofen (DE); Janos Toth, Kecskemet (HU); Sven Krueger, Munich (DE); Ahmed Saleme, Wuppertal (DE); Stephan Krinke, Muelheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 17/769,422

(22) PCT Filed: Oct. 14, 2020

(86) PCT No.: PCT/EP2020/078841
§ 371 (c)(1),
(2) Date: Apr. 15, 2022

(87) PCT Pub. No.: WO2021/074189
PCT Pub. Date: Apr. 22, 2021

(65) Prior Publication Data
US 2024/0124049 A1 Apr. 18, 2024

(30) Foreign Application Priority Data
Oct. 16, 2019 (DE) ...................... 10 2019 127 953.4

(51) Int. Cl.
*B62D 5/04* (2006.01)
*F16H 37/04* (2006.01)
(Continued)

(52) U.S. Cl.
CPC .......... *B62D 5/0448* (2013.01); *B62D 5/0415* (2013.01); *F16H 37/042* (2013.01); *F16H 2001/2881* (2013.01); *F16H 2057/085* (2013.01)

(58) Field of Classification Search
CPC ... B62D 5/0448; B62D 5/0415; F16H 37/042; F16H 2001/2881; F16H 2057/085; F16H 1/48
See application file for complete search history.

(56) References Cited

U.S. PATENT DOCUMENTS

2003/0047374 A1* 3/2003 Peppler ................ B62D 5/0421
180/443
2012/0241244 A1 9/2012 Escobedo et al.
(Continued)

FOREIGN PATENT DOCUMENTS

CN 102689649 A * 9/2012 ............... B62D 3/08
CN 205239630 U * 5/2016
(Continued)

OTHER PUBLICATIONS

Grau, Power Steering, Jan. 8, 2015, EPO, DE 102013107143 A1, Machine Translation of Description (Year: 2015).*
(Continued)

*Primary Examiner* — Paul N Dickson
*Assistant Examiner* — Matthew D Lee
(74) *Attorney, Agent, or Firm* — Crowell & Moring LLP

(57) ABSTRACT

A steering transmission for an electro-mechanical steering system for a vehicle includes an electric motor, a servo transmission, and an angle transmission for connecting a
(Continued)

steering column of the steering system to a control stalk of the steering system. The angle transmission is a mechanically driven recirculating-ball transmission with a ball nut, which is engaged with a segment shaft of the steering transmission that is/can be connected to the steering stalk. A spindle of the recirculating-ball transmission is continuous. The spindle is connected to an output shaft of the servo transmission on one side. The servo transmission is/can be driven by the electric motor.

11 Claims, 7 Drawing Sheets

(51) Int. Cl.
*F16H 1/28* (2006.01)
*F16H 57/08* (2006.01)

(56) References Cited

U.S. PATENT DOCUMENTS

| | | | |
|---|---|---|---|
| 2013/0032430 A1 | 2/2013 | Zaloga et al. | |
| 2014/0157922 A1* | 6/2014 | Schneider | B62D 3/08 74/89.34 |
| 2016/0327134 A1 | 11/2016 | Boiger et al. | |
| 2017/0146096 A1* | 5/2017 | Watanabe | F16C 19/16 |
| 2018/0244305 A1* | 8/2018 | Cai | B62D 5/001 |
| 2019/0085941 A1 | 3/2019 | Klassen et al. | |
| 2020/0339183 A1* | 10/2020 | DeHoff | B62D 5/0421 |
| 2021/0309286 A1* | 10/2021 | Kern | B62D 5/0421 |
| 2022/0169305 A1* | 6/2022 | Cartwright | B62D 5/0421 |

FOREIGN PATENT DOCUMENTS

| | | | | |
|---|---|---|---|---|
| CN | 107176203 A | | 9/2017 | |
| DE | 4243267 A1 * | | 6/1994 | B62D 5/008 |
| DE | 10 2004 057 925 A1 | | 6/2006 | |
| DE | 10 2005 005 425 A1 | | 8/2006 | |
| DE | 102005045291 A1 * | | 3/2007 | B62D 5/008 |
| DE | 10 2005 055 238 A1 | | 5/2007 | |
| DE | 20 2004 021 588 U1 | | 6/2009 | |
| DE | 102009046621 A1 * | | 5/2011 | B62D 5/0448 |
| DE | 10 2012 204 318 A1 | | 9/2012 | |
| DE | 10 2012 213 444 A1 | | 2/2013 | |
| DE | 102013107143 A1 * | | 1/2015 | B62D 5/0448 |
| DE | 10 2014 117 647 A1 | | 6/2016 | |
| DE | 10 2015 006 084 A1 | | 11/2016 | |
| DE | 10 2017 124 388 A1 | | 1/2019 | |
| JP | 2000-302050 A | | 10/2000 | |
| JP | 2003-312486 A | | 11/2003 | |
| JP | 2004-3537 A | | 1/2004 | |
| JP | 2012-92720 A | | 5/2012 | |
| JP | 2019-156082 A | | 9/2019 | |
| WO | WO-2006058660 A1 * | | 6/2006 | B62D 5/008 |
| WO | WO-2020004897 A1 * | | 1/2020 | B62D 3/04 |

OTHER PUBLICATIONS

Ertle, Power Steering, May 12, 2011, EPO, DE 102009046621 A1, Machine Translation of Description (Year: 2011).*
Meintschel, Interlocking Device For Vehicle Steering System, Mar. 29, 2007, EPO, DE 102005045291 A1, Machine Translation of Description (Year: 2007).*
Hackl, Steering Drive For Steering Motor Vehicles With First And Second Inputs, Jun. 23, 1994, EPO, DE 4243267 A1, Machine Translation of Description (Year: 1994).*
Japanese-language Office Action issued in Japanese Application No. 2022-523018 dated Apr. 26, 2023 with English translation (17 pages).
International Preliminary Report on Patentability (PCT/IB/326 & PCT/IB/373) issued in PCT Application No. PCT/EP2020/078841 dated Apr. 28, 2022, including English translation of document C2 (German-language Written Opinion (PCT/ISA/237) filed on Apr. 15, 2022) (eight (8) pages).
Chinese-language Office Action issued in Chinese Application No. 202080072649.8 dated Mar. 31, 2023 with English translation (13 pages).
International Search Report (PCT/ISA/210) issued in PCT Application No. PCT/EP2020/078841 dated Jan. 18, 2021 with English translation (five (5) pages).
German-language Written Opinion (PCT/ISA/237) issued in PCT Application No. PCT/EP2020/078841 dated Jan. 18, 2021 (six (6) pages).
German-language Office Action issued in German Application No. 10 2019 127 953.4 dated Aug. 6, 2020 (eight (8) pages).
"Verzahnungsgesetz", Wikipedia, Aug. 23, 2018, pp. 1, Retrieved from https://de.wikiedia.org/w/index.php?title=Verzahnungsgesetz&oldid=180254725 (one (1) page).
"Evolventenverzahnung", Wikipedia, Jan. 29, 2020, pp. 1-4, Retrieved from https://de.wikiedia.org/w/index.php?title=Evolventenverzahnung&oldid=190943135 (four (4) page).
Beitz et al., "Taschenbuch Fuer Den Maschinenbau", Springer, 1997, pp. 1-7, (eight (8) pages).
"Profilverschiebung", Wikipedia, Jul. 22, 2019, pp. 1-4, Retrieved from https://de.wikiedia.org/w/index.php?title= Profilverschiebung&oldid=190636869 (four (4) page).
Japanese-language Office Action issued in Japanese Appiication No. 2022-523018 dated Apr. 23, 2024 with English transiation (8 pages).

* cited by examiner

STEERING TRANSMISSION FOR ELECTROMECHANICAL STEERING SYSTEM FOR A VEHICLE AND ELECTROMECHANICAL STEERING SYSTEM FOR A VEHICLE

BACKGROUND AND SUMMARY

The present invention relates to a steering transmission for an electromechanical steering system for a vehicle and to an electromechanical steering system for a vehicle, in particular for a utility vehicle.

A power steering system as part of a steering system of a utility (commercial) vehicle may generally be implemented as a hydraulic system. Hydraulic systems may be disadvantageous relative to energy efficiency, wherein a high volumetric flow has to be pumped through the steering system at all times in order to provide a steering force. Moreover, functional developments, in addition to the actual steering function, such as for example driver assist systems, are expensive to implement. Moreover, lines which have to be installed, filled and tested during the assembly of a vehicle may generally be required between a steering pump and a steering transmission, due to the separate installation locations thereof.

Against this background, it is the object of the present invention to provide an improved steering transmission for an electromechanical steering system for a vehicle and an improved electromechanical steering system for a vehicle.

This object is achieved by a steering transmission for an electromechanical steering system for a vehicle and by an electromechanical steering system for a vehicle according to the independent claims.

According to embodiments, in particular a servo transmission unit, for example a planetary servo transmission unit or an eccentric servo transmission unit for an electric power steering system with a recirculating-ball transmission may be provided for a power steering system of a steering system for a utility vehicle or a steering system for a utility vehicle. In this case, for example, a recirculating-ball steering transmission may be arranged with an electrically operated servo transmission, in particular a planetary transmission or planetary eccentric transmission, for an electric power steering system of a utility vehicle. A servo assistance may be reinforced, for example, by a planetary servo transmission or a planetary eccentric servo transmission driven by an electric motor. Such a servo transmission unit, in particular a planetary servo transmission or a planetary eccentric servo transmission, may be connected to a spindle of a recirculating-ball steering unit which may transmit a reinforced electrically assisted torque to a segment shaft or output shaft of the power steering transmission.

According to embodiments, in particular, an installation space requirement may be advantageously reduced compared with a conventional planetary servo transmission with two transmission stages with the same transmission ratio. Additionally, for example, a number of meshing or engaging components may be reduced compared with a conventional two-stage planetary transmission. In other words, therefore, a space-saving and low maintenance steering transmission may be provided for an electromechanical steering system of a vehicle, in particular a utility vehicle. Thus production costs may be lowered by a reduced number of gearwheels in comparison with a conventional two-stage planetary transmission.

A steering transmission for an electromechanical steering system for a vehicle comprises an electric motor, a servo transmission and an angle transmission for connecting a steering column of the steering system to a control stalk of the steering system, wherein the angle transmission is a mechanically driven recirculating-ball transmission with a ball nut which is engaged with a segment shaft of the steering transmission that is/can be connected to the control stalk, wherein a spindle of the recirculating-ball transmission is continuous, wherein the spindle is connected to an output shaft of the servo transmission on one side, wherein the servo transmission is/can be driven by the electric motor.

The vehicle may be a motor vehicle for transporting people and, additionally or alternatively, goods, in particular a utility vehicle, for example a truck or the like. Each of the transmissions may also be denoted as a transmission unit. The servo transmission may be coupled to the electric motor. If two components are connected or coupled to one another, a positive connection and, additionally or alternatively, a non-positive connection may be present between the components.

According to one embodiment, the servo transmission may be a planetary transmission. In this case, the planetary transmission may have planet wheels with an identical number of teeth and geometry. In this case, the planet wheels may mesh with two independent ring gears with different numbers of teeth. The planet wheels are/can be driven by the electric motor via a carrier. The planet wheels may be mounted on the carrier. The carrier may be driven by the electric motor. Such an embodiment provides the advantage that it is possible to implement an electromechanical drive for the steering system which is particularly space-saving and reliable and with no imbalance.

Alternatively, the servo transmission may be an eccentric planetary transmission. In this case, the eccentric planetary transmission may have a common planet wheel. In this case, the planet wheel may mesh with two ring gears. In this case, a difference in the number of teeth between the two ring gears may be greater than or equal to 1. The planet wheel may be mounted eccentrically on a carrier which is/can be driven by the electric motor. Such an embodiment provides the advantage that an electromechanical drive which is particularly space-saving and reliable and resilient may be provided for the steering system.

In this case, a tip of the planet wheel may be formed so as to be cut away depending on an engagement cross section. Such an embodiment provides the advantage that different engagement cross sections may be taken into account in order to implement a reliable torque transmission.

In this case, the planet wheel may also be mounted in an adjustable manner on a carrier in order to adjust a gearwheel clearance of a gearwheel engagement between the planet wheel and at least one of the two rings gears. More specifically, a gear stage or stage, for example preferably stage 2, may be adjusted virtually without clearance via the eccentric. Such an embodiment provides the advantage that a torque transmission may be achieved with minimal wear and minimum losses.

According to one embodiment, tooth regions of the at least one planet wheel and, additionally or alternatively, the ring gears may be formed with a profile shift. Such an embodiment provides the advantage that an engagement or meshing of the respective gear wheels may be achieved in a correct and secure manner.

Moreover, the ball nut of the recirculating-ball transmission may have a linear guide device which is configured to absorb radial loads introduced by a toothing between the segment shaft and the ball nut. Such an embodiment provides the advantage that a reliable continuous operation of the steering transmission may be made possible by such a reinforcement and additional bearing fastening in order to reduce radial loads, which may act during operation on the ball mechanism.

In this case, the linear guide device may be designed as a plain bearing, in particular as a multi-layer plain bearing or as a plastics plain bearing. Such an embodiment provides the advantage that conventional and readily available bearing devices may be used in order to achieve a reliable load absorption.

Alternatively, the linear guide device may be designed as a rolling bearing, in particular as a needle bearing or as a combination of a needle bearing and rolling bearing. Such an embodiment provides the advantage that conventional and readily available bearing devices may be used in order to achieve a reliable load absorption.

An electromechanical steering system for a vehicle has a steering column and a control stalk, wherein the electromechanical steering system has an embodiment of the aforementioned steering transmission, wherein the steering column and the control stalk are connected together by means of the steering transmission.

An embodiment of the aforementioned steering transmission may be advantageously used or utilized in combination with the electromechanical steering system, in order to apply a steering torque which represents a torque of a steering input on a steering wheel and a supporting torque which represents a torque provided by the electric motor and the servo transmission, onto the segment shaft via the angle transmission. The electromechanical steering system may be denoted as an electromechanical power steering system or as a power steering system with an electromechanical drive.

Exemplary embodiments of the approach set forth herein are described in more detail in the following description with reference to the figures.

DETAILED DESCRIPTION OF THE DRAWINGS

Figure 1:
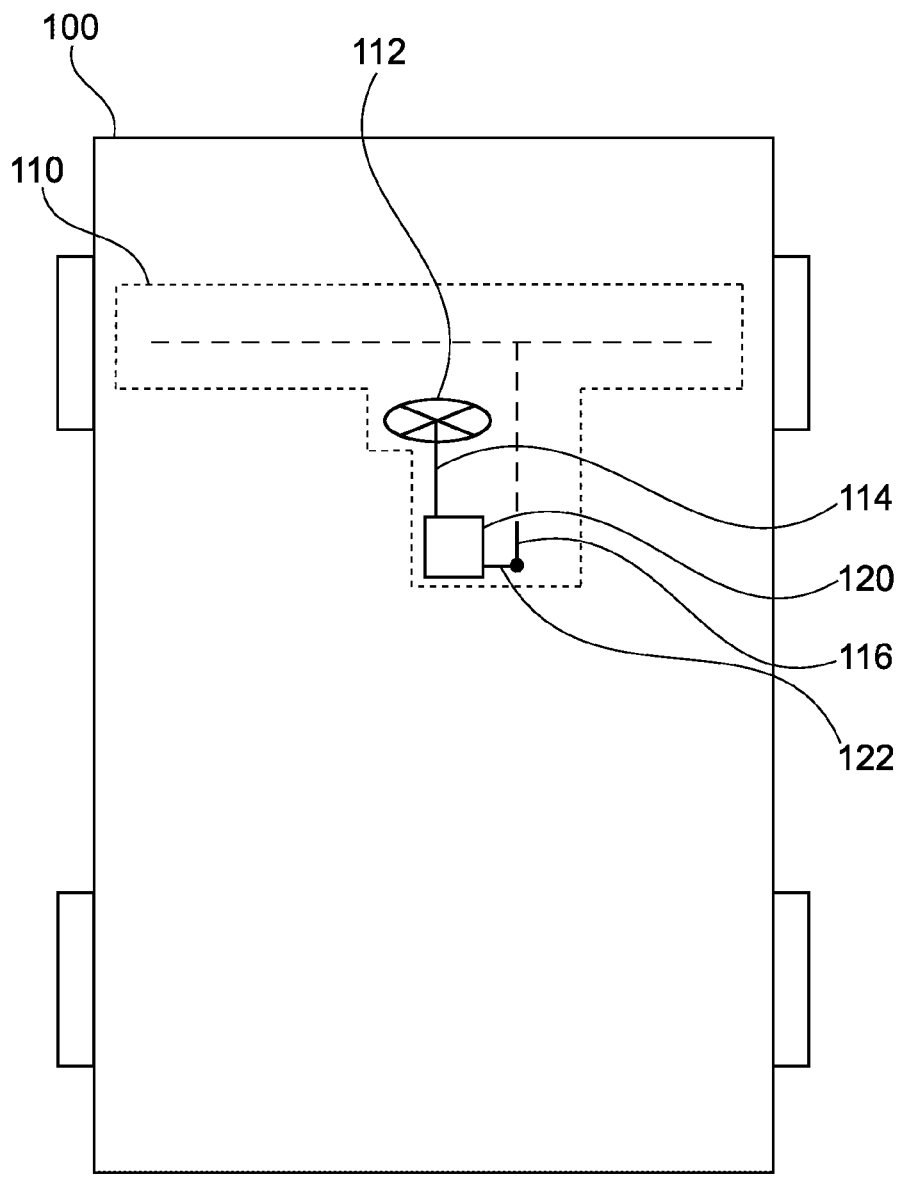
FIG. 1 is a schematic view of a vehicle with an electromechanical steering system according to an exemplary embodiment.

FIG. 1 is a schematic view of a vehicle 100 with an electromechanical steering system 110 according to an exemplary embodiment. The vehicle 100 is a motor vehicle, in particular a utility (commercial) vehicle, such as for example a truck or the like. The steering system 110 has a steering column 114 and a control stalk 116. The steering column 114 is connected to a steering wheel 112. The steering wheel 112 may also be part of the steering system 110. The control stalk 116 is coupled to steerable wheels via suitable devices, by way of example an axle of the vehicle 100. Moreover, the steering system 110 has a steering transmission 120. The steering transmission 120 is designed as an electromechanical steering transmission or with an electromechanical drive. The steering column 114 and the control stalk 116 are connected together by means of the steering transmission 120 or via the steering transmission 120. In this case, a segment shaft 122 of the steering transmission 120 is also shown in FIG. 1. The segment shaft 122 is connected to the control stalk 116. Further detail is provided relative to the steering transmission 120 with reference to the following figures.

Figure 2:
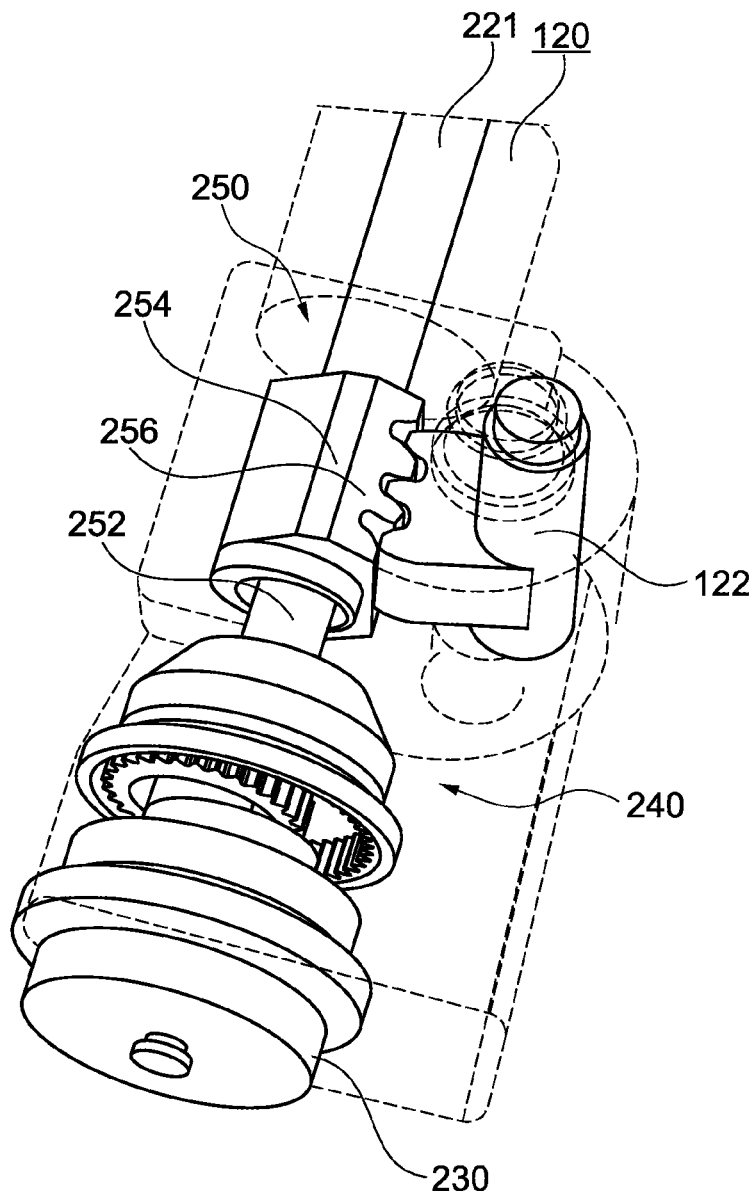
FIG. 2 is a schematic view of a steering transmission according to an exemplary embodiment.

FIG. 2 shows a schematic view of a steering transmission 120 according to an exemplary embodiment. The steering transmission 120 in this case is shown in an oblique view. The steering transmission 120 corresponds or is similar to the steering transmission of FIG. 1. Thus the steering transmission 120 is provided for an electromechanical steering system for a vehicle. The steering transmission 120 comprises an electric motor 230, a servo transmission 240 or a servo transmission unit 240 and an angle transmission 250. Moreover, the steering transmission 120 comprises the segment shaft 122 and an input shaft 221. The segment shaft 122 is/can be coupled to a control stalk of the steering system. The segment shaft 122 serves for transmitting a pivoting mobility via the control stalk to a steering rod of the steering system, which for example moves the front wheels of the vehicle in a desired direction. The input shaft 221 is/can be coupled to a steering column of the steering system.

The angle transmission 250 is configured in order to connect the steering column of the steering system, which is coupled to the input shaft 221, to the control stalk of the steering system, which is coupled to the segment shaft 122. The angle transmission 250 is a mechanically driven recirculating-ball transmission. In this case, the angle transmission 250 has a spindle 252 and a ball nut 254 which is coupled or in engagement with the segment shaft 122 via a toothed portion 256. The spindle 252 is designed to be continuous. The spindle 252 extends between the input shaft 221 and the servo transmission 240. The spindle 252 is connected at one end via a torsion bar to the input shaft 221. At the opposing end, the spindle 252 is connected to the servo transmission 240, more specifically to an output shaft of the servo transmission 240. The servo transmission 240 is/can be driven by the electric motor 230. The electric motor 230 is connected to the servo transmission 240. According to the exemplary embodiment shown in FIG. 2, the servo transmission 240 is designed as a planetary servo transmission or planetary transmission. The servo transmission 240 is connected between the electric motor 230 and the angle transmission 250.

The steering transmission 120 has by way of example dimensions which correspond to an installation space of for example 160 millimeters×210 millimeters×160 millimeters.

Figure 3:
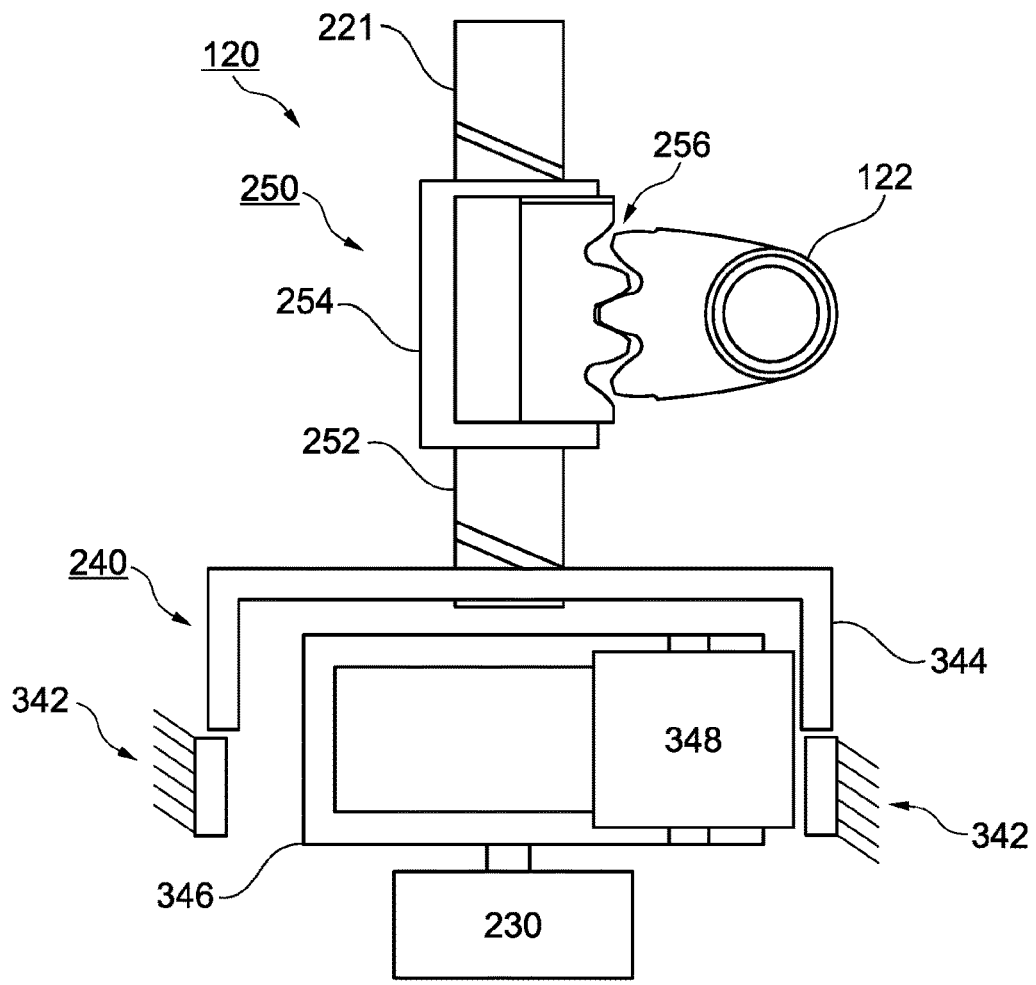
FIG. 3 is a schematic view of the steering transmission of FIG. 2.

FIG. 3 shows a schematic view of the steering transmission 120 of FIG. 2. In FIG. 3 the steering transmission 120 is shown in a partial sectional view. In this case, a first ring gear 342, a second ring gear 344, a carrier 346 and one of a plurality of planet wheels 348 are also shown as components of the servo transmission 240. The servo transmission 240 which is designed as a planetary transmission or planetary servo transmission has a plurality of planet wheels 348. The planet wheels 348 have an identical number of teeth and an identical geometry. The first ring gear 342 and the second ring gear 344 are independent of one another. Moreover, the first ring gear 342 and the second ring gear 344 have different numbers of teeth. The planet wheels 348 mesh with the ring gears 342 and 344. The planet wheels 348 are coupled via the carrier 346 to the electric motor 230 and are/can be driven thereby.

According to the exemplary embodiment shown here, the planetary servo transmission unit or servo transmission 240 comprises a conventional planetary gear train with two ring gears 342 and 344 with internal toothing or internal gearwheels as central wheel shafts and a carrier 346 or a carrier shaft which is driven by a torque of the electric motor 230. The carrier 346 comprises, for example, three circumferentially arranged planets or planet wheels 348. Each planet meshes with two ring gears 342 and 344 or outer wheels. Resulting gearwheel engagement forces are absorbed by planet bearings which are mounted on planet pins, wherein the forces are transmitted to the carrier 346 or planet carrier. The first ring gear 342 is fastened to a housing of the steering transmission 120 and thus may not rotate. The second ring gear 344 is directly connected to the spindle 252 by a shaft-hub connection or the like and represents the output shaft of the servo transmission 240.

A number of teeth of the first ring gear 342 is slightly less than that of the second ring gear 344, resulting in a positive stationary transmission ratio of slightly more than 1.0. The importance of the stationary transmission ratio is the characteristic ratio for planet gearwheel sets when the carrier shaft is fixed and a central shaft drives the other. With a given gearwheel set configuration this results in a high ratio, which is determined by the Willis equation. For efficient gearwheel contact, the gearwheel teeth of the servo transmission 240 may be designed as low-loss teeth which provide prolonged sliding or slippage for improved efficiency.

The first ring gear 342 may have a number of teeth $Z_{H1}$ of 53, $Z_{H1}=53$. The second ring gear 344 may have a number of teeth $Z_{H2}$ of 55, $Z_{H2}=55$. Each planet wheel 348 may have a number of teeth $Z_P$ of 23, $Z_P=23$. A torque of the electric motor 230 may be, for example, 20 Newton meters. An efficiency η of the servo transmission 240 may be 90.85 percent. In this case, a torque of, for example, 512 Newton meters may be transmitted to the spindle 252 by the servo transmission 240. An efficiency η of the angle transmission 250 may be, for example, 90 percent. A transmission ratio $i_{BS}$ of the angle transmission 250 may be, for example, 18, $i_{BS}=18$. A total transmission ratio $i_{GES}$ may be, for example, 495, $i_{GES}=495$. A torque transmitted from the angle transmission 150 to the segment shaft 122 may in this case be, for example, 8197 Newton meters.

Figure 4:
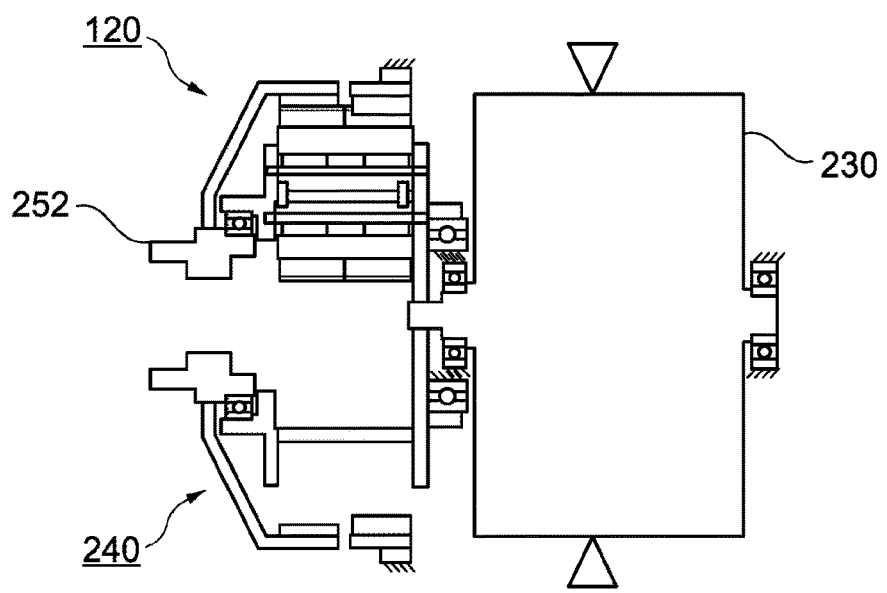
FIG. 4 is a schematic view of a partial portion of the steering transmission of FIG. 2 or FIG. 3.

FIG. 4 shows a schematic view of a partial portion of the steering transmission 120 of FIG. 2 or FIG. 3. In FIG. 4 the steering transmission 120 is shown in a partial sectional view. The partial portion shown in FIG. 4 of the steering transmission 120 comprises the electric motor 230, the servo transmission 240 and a partial portion of the spindle 252.

Figure 5:
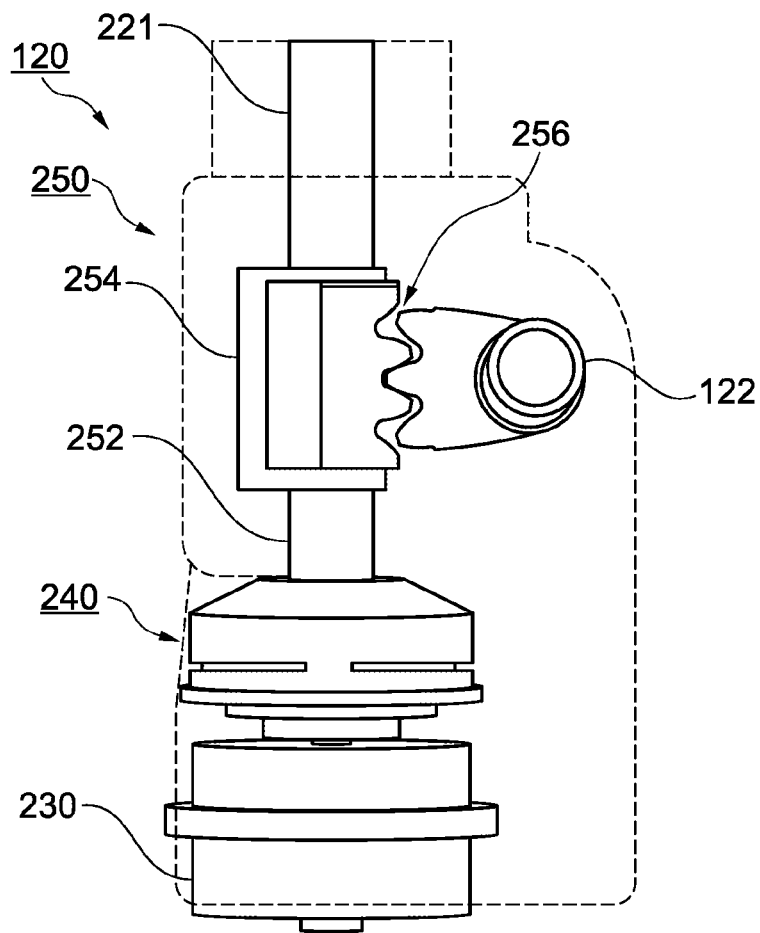
FIG. 5 is a schematic view of the steering transmission of FIG. 2, FIG. 3 or FIG. 4.

FIG. 5 shows a schematic view of the steering transmission of FIG. 2, FIG. 3 or FIG. 4. In FIG. 5 the steering transmission 120 is shown in a side view. In particular, the view in FIG. 5 corresponds to the view of FIG. 2 with the exception that the perspective is different.

Figure 6:
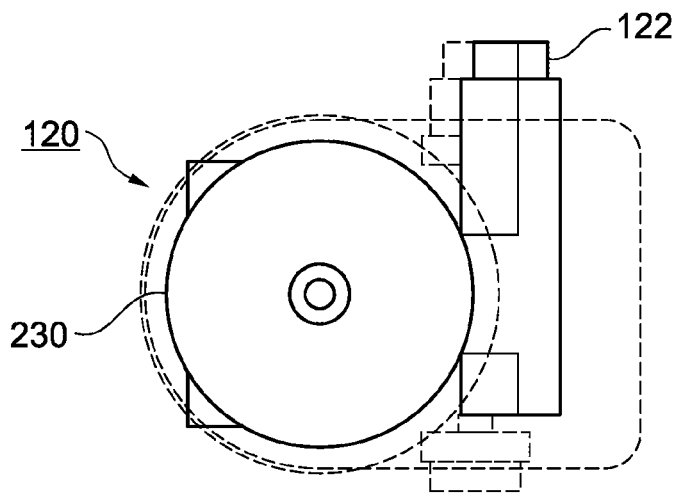
FIG. 6 is a schematic view of the steering transmission of FIG. 2, FIG. 3, FIG. 4 or FIG. 5.

FIG. 6 shows a schematic view of the steering transmission of FIG. 2, FIG. 3, FIG. 4 or FIG. 5. In FIG. 6 the steering transmission 120 is shown in a plan view of the electric motor 230. In particular, the view in FIG. 6 corresponds to the view of FIG. 2 or FIG. 5 with the exception that the perspective is different. In this case, due to the drawing, the segment shaft 122 and the electric motor 230 are explicitly shown as components of the steering transmission 120.

Figure 7:
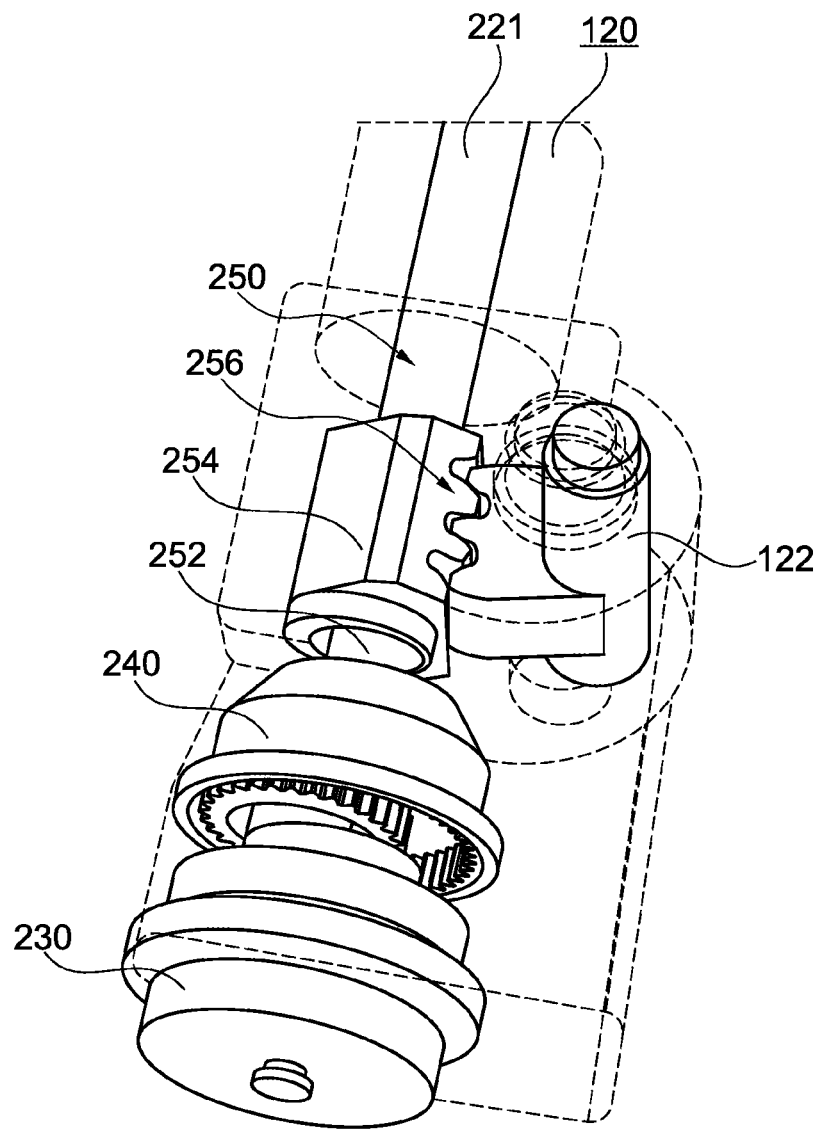
FIG. 7 is a schematic view of a steering transmission according to an exemplary embodiment.

FIG. 7 shows a schematic view of a steering transmission 120 according to an exemplary embodiment. The steering transmission 120 in this case is shown in an oblique view. The steering transmission 120 in FIG. 7 corresponds to the steering transmission of FIG. 2 with the exception that the servo transmission 240 is configured as an eccentric transmission, eccentric planetary transmission or planetary eccentric transmission.

The steering transmission 120 has by way of example dimensions which correspond to an installation space of, for example, 180 millimeters×235 millimeters×180 millimeters.

Figure 8:
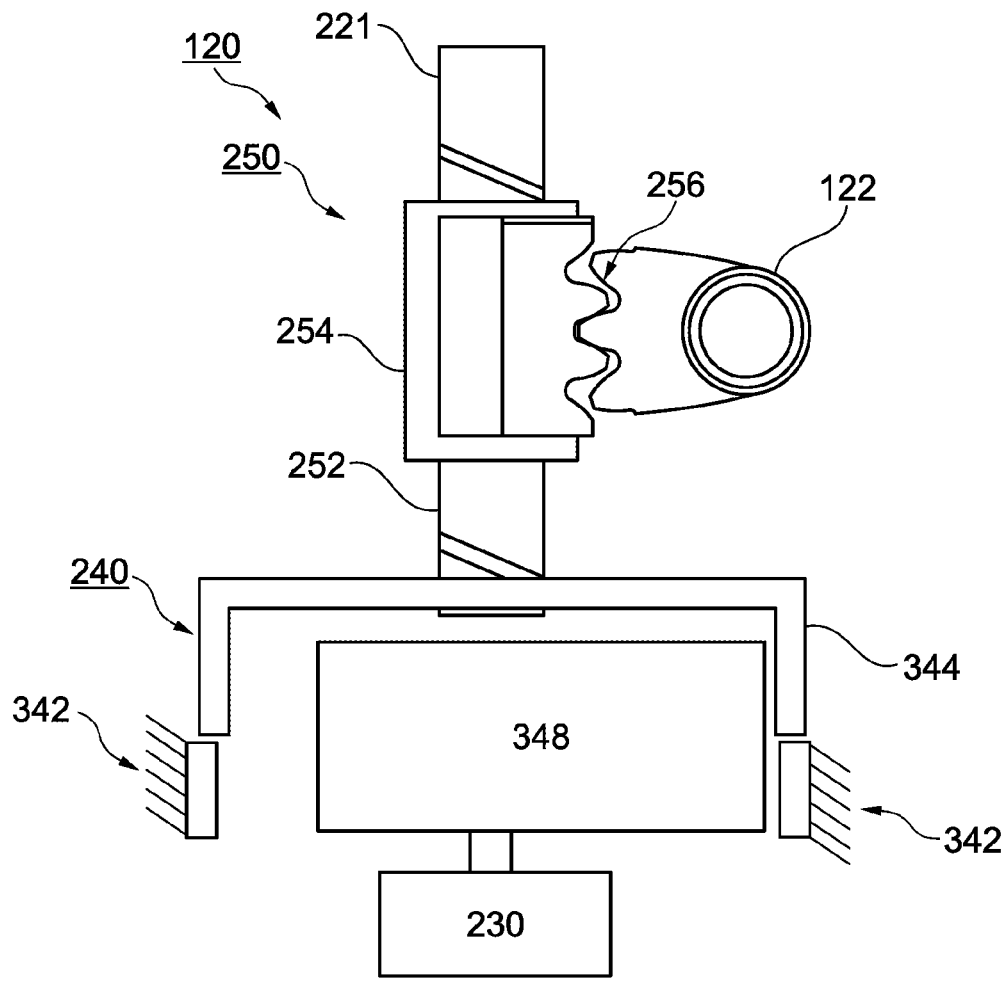
FIG. 8 is a schematic view of the steering transmission of FIG. 7.

FIG. 8 shows a schematic view of the steering transmission 120 of FIG. 7. In FIG. 8 the steering transmission 120 is shown in a partial sectional view. The view in FIG. 8 is similar to the view of FIG. 3. In this case, a first ring gear 342, a second ring gear 344 and a common planet wheel 348 or planet wheel pair are also shown as components of the servo transmission 240. The common planet wheel 348 meshes with the two ring gears 342 and 344. In this case, a difference in the number of teeth between the two ring gears 342 and 344 is greater than or equal to 1. The common planet wheel 348 is mounted eccentrically on a carrier which is/can be driven by the electric motor 230.

The servo transmission 240 which is designed as planetary eccentric servo transmission unit or eccentric transmission comprises a conventional planetary gear train with two ring gears 342 and 344 or inner gearwheels as central wheel shafts and a carrier or a carrier shaft which is driven by a torque of the electric motor 230. The carrier is directly connected to a rotor shaft of the electric machine or the electric motor 230 and has a planet wheel 348 which meshes with both ring gears 342 and 344. The resulting gearwheel engagement forces are absorbed by planet bearings which are mounted on a planet pin, wherein the forces are transmitted to the carrier or planet carrier. The first ring gear 342 is fastened to a housing of the steering transmission 120 and thus is not able to rotate. The second ring gear 344 is directly connected to the spindle 252 via a shaft-hub connection and represents an output shaft of the servo transmission 240.

According to an exemplary embodiment, a connection of the planet pin to the carrier or the carrier shaft is performed in an adjustable manner. During assembly, therefore, an eccentric connection may be adjusted such that a gearwheel clearance of the gearwheel engagement between the planet wheel 348 and one of the two ring gears 342 and 344 may be eliminated. A gearwheel engagement without gearwheel clearance permits changes to a rotational direction of the servo transmission 240 or the steering transmission 120 without torque interruption.

A number of teeth of the first ring gear 342 is slightly less than that of the second ring gear 344, whereby a positive stationary transmission ratio of slightly more than 1.0 results. The importance of the stationary transmission ratio is the characteristic ratio for the planet gearwheel sets when the carrier shaft is fixed and a central shaft drives the other. In a given gearwheel set configuration this results in a high ratio which is determined by the Willis equation. The number of teeth of the common planet wheel 348 is selected such that the difference in the number of teeth of the inner gearwheels is approximately 7 or 8.

The first ring gear 342 may have a number of teeth $Z_{H1}$ of 28, $Z_{H1}$=28. The second ring gear 344 may have a number of teeth $Z_{H2}$ of 29, $Z_{H2}$=29. The common planet wheel 348 may have a number of teeth $Z_P$ of 21, $Z_P$=21. A torque of the electric motor 230 may be, for example, 20 Newton meters. An efficiency η of the servo transmission 240 may be, for example, 92.85 percent. In this case, a torque of for example 534 Newton meters may be transmitted onto the spindle 252 by the servo transmission 240. An efficiency η of the angle transmission 250 may be, for example, 90 percent. A transmission ratio $i_{BS}$ of the angle transmission 250 may be, for example, 18, $i_{BS}$=18. A total transmission ratio $i_{GES}$ may be, for example, 522, $i_{GES}$=522. A torque transmitted from the angle transmission 150 to the segment shaft 122 may in this case be, for example, 8699 Newton meters.

A tooth geometry of the planet wheel 348 is identical for both gearwheel engagements with the two ring gears 342 and 344, which permits a simple production of the planet wheel 348. The gearwheel engagement with the fixed first ring gear 342 is in the upper region of the gearwheel teeth of the planet wheel 348 and the gearwheel engagement with the second ring gear 344 which is connected to the spindle 252 or spindle shaft is in the lower region of the gearwheel teeth of the planet wheel 348. In order to avoid disruption, tooth tips of the planets of 348 in the region of the engagement of the second ring gear 344, which is connected to the spindle 252 and has a higher number of teeth, are rotated on a smaller diameter. For efficient gearwheel contact, the gearwheel teeth may be designed as low-loss teeth which provide prolonged sliding and/or slippage for improved efficiency.

Figure 9:
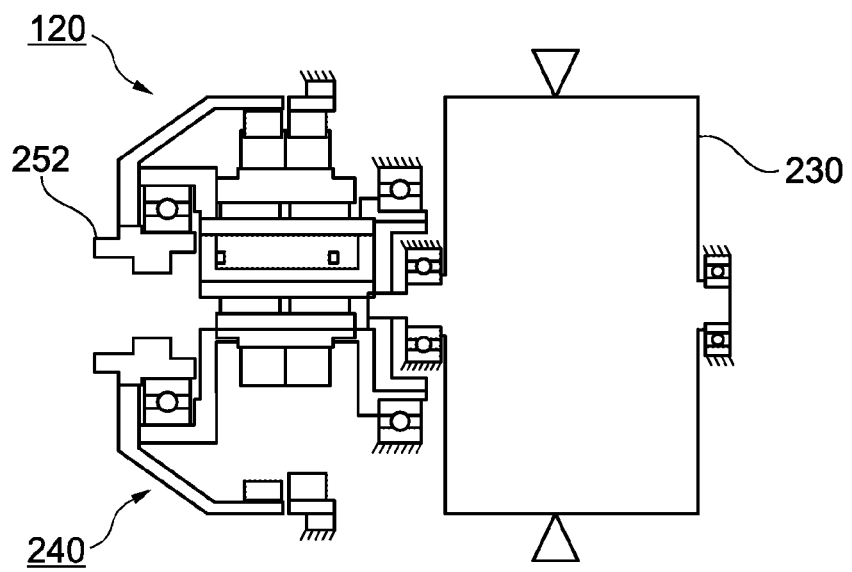
FIG. 9 is a schematic view of the steering transmission of FIG. 7 or FIG. 8.

FIG. 9 shows a schematic view of the steering transmission 120 of FIG. 7 or FIG. 8. In FIG. 9 the steering transmission 120 is shown in a partial sectional view. The view in FIG. 9 is similar to the view of FIG. 4. The partial portion shown in FIG. 9 of the steering transmission 120 comprises the electric motor 230, the servo transmission 240 and a partial portion of the spindle 252.

Figure 10:
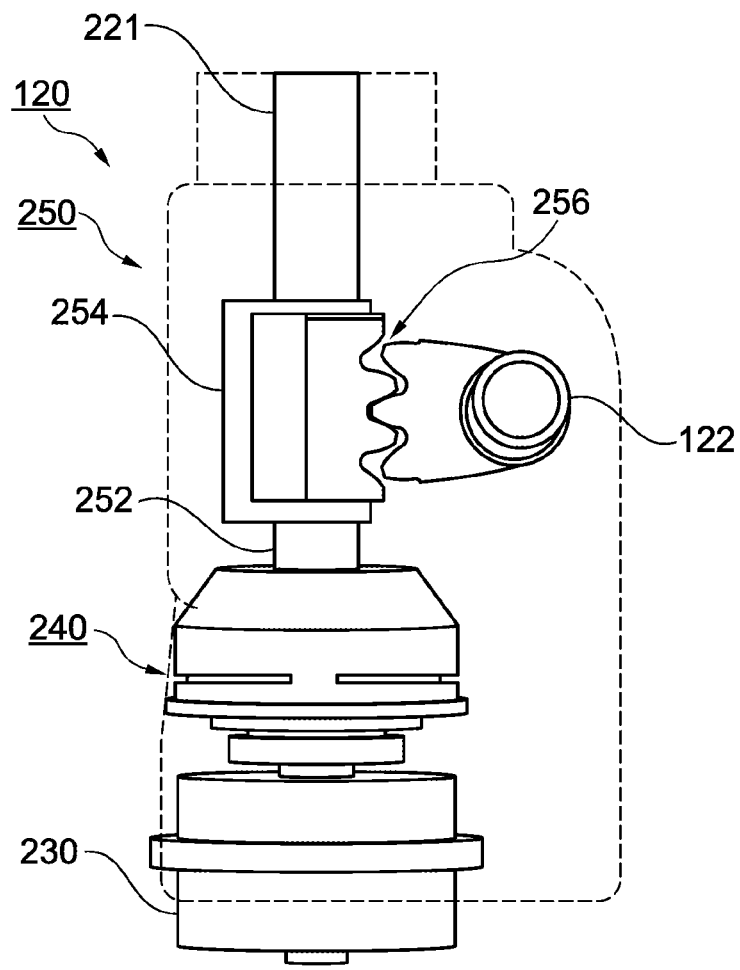
FIG. 10 is a schematic view of the steering transmission of FIG. 7, FIG. 8 or FIG. 9.

FIG. 10 shows a schematic view of the steering transmission 120 of FIG. 7, FIG. 8 or FIG. 9. In FIG. 10 the steering transmission 120 is shown in a side view. The view in FIG. 10 is similar to the view of FIG. 5. In particular, the view in FIG. 10 corresponds to the view of FIG. 7 with the exception that the perspective is different.

Figure 11:
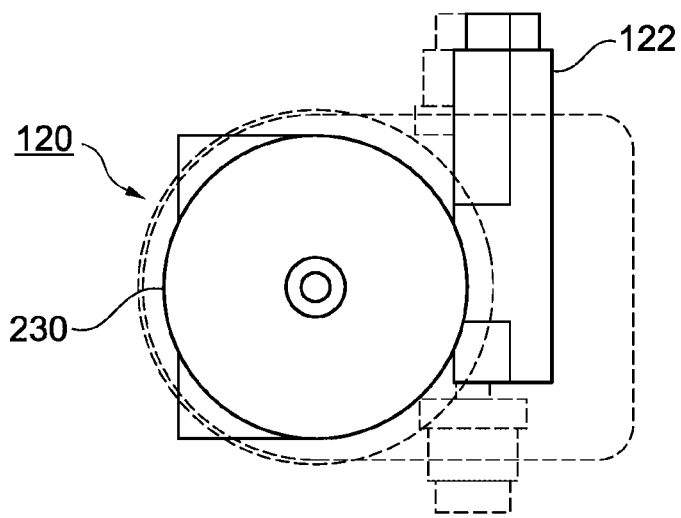
FIG. 11 is a schematic view of the steering transmission of FIG. 7, FIG. 8, FIG. 9 or FIG. 10.

FIG. 11 shows a schematic view of the steering transmission 120 of FIG. 7, FIG. 8, FIG. 9 or FIG. 10. In FIG. 11 the steering transmission 120 is shown in a plan view of the electric motor 230. The view in FIG. 11 is similar to the view of FIG. 6. In particular, the view in FIG. 11 corresponds to the view of FIG. 7 or FIG. 10 with the exception that the perspective is different. In this case, the segment shaft 122 and the electric motor 230 are explicitly shown as components of the steering transmission 120.

With reference to the above-described figures, it should be mentioned that, according to an exemplary embodiment of the steering transmission 120, the tooth regions of the at least one planet wheel 348 and/or the ring gears 342 and 344 may also be formed with a profile shift.

LIST OF REFERENCE NUMERALS

100 Vehicle
110 Steering system
112 Steering wheel
114 Steering column
116 Control stalk
120 Steering transmission
122 Segment shaft
221 Input shaft
230 Electric motor
240 Servo transmission
250 Angle transmission
252 Spindle
254 Ball nut
256 Tooth portion
342 First ring gear
344 Second ring gear
346 Carrier
348 Planet wheel

What is claimed is:

1. A steering transmission for an electromechanical steering system for a vehicle, comprising:
    a housing;
    an electric motor comprising a rotor shaft;
    a servo transmission, wherein
        the servo transmission is an eccentric planetary transmission,
        the eccentric planetary transmission has a common planet wheel,
        the common planet wheel meshes with first and second ring gears, wherein a difference in the number of teeth between the first and second ring gears is greater than or equal to 1, wherein the first ring gear is fastened to the housing and is not able to rotate, and
        the planet wheel is mounted eccentrically on a carrier which is directly connected to, and drivable by, the electric motor; and
    an angle transmission for connecting a steering column of the steering system to a control stalk of the steering system, wherein
    the angle transmission is a mechanically driven recirculating-ball transmission with a ball nut which is engaged with a segment shaft of the steering transmission that is connectable to the control stalk,
    a spindle of the recirculating-ball transmission is continuous,
    the spindle is directly connected to the second gear via a shaft-hub connection, wherein the second gear defines an output shaft of the servo transmission, and
    the servo transmission is drivable by the electric motor.

2. The steering transmission as claimed in claim 1, wherein
    tips of teeth on the planet wheel are cut away to define different engagement cross sections.

3. The steering transmission as claimed in claim 1, wherein
    the planet wheel is mounted in an adjustable manner on a carrier in order to adjust a gearwheel clearance of a gearwheel engagement between the planet wheel and at least one of the two ring gears.

4. The steering transmission as claimed in claim 1, wherein
    tooth regions of the planet wheels and/or the ring gears are formed with a profile shift.

5. The steering transmission as claimed in claim 1, wherein
    tooth regions of the common planet wheel and/or the ring gears are formed with a profile shift.

6. The steering transmission as claimed in claim 1, wherein
the ball nut of the recirculating-ball transmission has a linear guide which is configured to absorb radial loads introduced by a toothing between the segment shaft and the ball nut.

7. The steering transmission as claimed in claim 6, wherein
the linear guide is a plain bearing.

8. The steering transmission as claimed in claim 6, wherein
the linear guide is a multi-layer plain bearing or a plastics plain bearing.

9. The steering transmission as claimed in claim 6, wherein
the linear guide is a rolling bearing.

10. The steering transmission as claimed in claim 6, wherein
linear guide is a needle bearing or a combination of a needle bearing and a rolling bearing.

11. An electromechanical steering system for a vehicle, comprising the:
a steering column;
a control stalk; and
a steering transmission connecting the steering column and the control stalk, the steering transmission comprising:
a housing;
an electric motor comprising a rotor shaft;
a servo transmission, wherein
the servo transmission is an eccentric planetary transmission,
the eccentric planetary transmission has a common planet wheel,
the common planet wheel meshes with first and second ring gears, wherein a difference in the number of teeth between the first and second ring gears is greater than or equal to 1, wherein the first gear is fastened to the housing and is not able to rotate, and
the planet wheel is mounted eccentrically on a carrier which is drivable by the electric motor; and
an angle transmission for connecting a steering column of the steering system to a control stalk of the steering system, wherein
the angle transmission is a mechanically driven recirculating-ball transmission with a ball nut which is engaged with a segment shaft of the steering transmission that is connectable to the control stalk,
a spindle of the recirculating-ball transmission is continuous,
the spindle is directly connected to the second gear via a shaft-hub connection, wherein the second gear defines an output shaft of the servo transmission, and
the servo transmission is drivable by the electric motor.

\* \* \* \* \*